United States Patent
Haan et al.

(10) Patent No.: US 6,639,664 B2
(45) Date of Patent: *Oct. 28, 2003

(54) ENDOSCOPE FOR INSPECTION OF AN OBSERVATION CAVITY

(75) Inventors: Harald Haan, Schaffhausen (CH); Beat Krattiger, Beringen (CH); Manfred Kuster, Schaffhausen (CH); Pavel Novak, Schaffhausen (CH); Jörg Reling, Weilheim (DE)

(73) Assignee: Storz Endoskop GmbH (CH)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/479,700

(22) Filed: Jan. 7, 2000

(65) Prior Publication Data

US 2003/0002036 A1 Jan. 2, 2003

Related U.S. Application Data

(63) Continuation of application No. PCT/EP99/03336, filed on May 12, 1999.

(30) Foreign Application Priority Data

May 13, 1998 (DE) .......................... 198 21 401

(51) Int. Cl.$^7$ ............................... G02B 23/24
(52) U.S. Cl. .................. 356/241.1; 356/241.5
(58) Field of Search .................... 356/241.1, 241.3, 356/241.4, 241.5, 241.6

(56) References Cited

U.S. PATENT DOCUMENTS

| | | | | |
|---|---|---|---|---|
| 3,575,528 A | * | 4/1971 | Beam et al. | 416/39 |
| 4,685,402 A | * | 8/1987 | Nelson et al. | 109/65 |
| 4,744,407 A | * | 5/1988 | Fishman et al. | 164/457 |
| 5,396,080 A | * | 3/1995 | Hannotiau et al. | 356/632 |
| 5,809,998 A | * | 9/1998 | Hughes et al. | 128/39 |

* cited by examiner

*Primary Examiner*—Richard A. Rosenberger
(74) *Attorney, Agent, or Firm*—St. Onge Steward Johnston & Reens LLC

(57) ABSTRACT

An endoscope for inspection of an observation cavity, in particular of an observation cavity in which a hot medium and/or infrared radiation is present, has a shaft in which an optical system is arranged. The shaft has an inner shaft and an outer shaft surrounding the latter at a distance, the optical system being arranged in the inner shaft. The shaft is configured in the region of its distal end in such a way that it is substantially opaque to electromagnetic radiation in the infrared spectral range.

19 Claims, 3 Drawing Sheets

ENDOSCOPE FOR INSPECTION OF AN OBSERVATION CAVITY

CROSS REFERENCE TO PENDING APPLICATION

This application is a continuation of pending International application PCT/EP99/03336 filed May 12, 1999.

BACKGROUND OF THE INVENTION

The present invention relates to an endoscope for inspection of an observation cavity, in particular of an observation cavity in which a hot medium and/or infrared radiation is present, having a shaft in which an optical system is arranged, the shaft having an inner shaft and an outer shaft surrounding the latter at a distance, the optical system being arranged in the inner shaft, and the shaft being configured in the region of its distal end in such a way that it is substantially impermeable to electromagnetic radiation in the infrared spectral range.

An endoscope of this kind for technical applications is known from DE 44 38 229 C2.

An endoscope of this kind is generally used to observe dynamic processes in an observation cavity, for example a reaction chamber or a combustion chamber, directly through an eyepiece at the proximal end of the endoscope, or to transmit images, by way of a camera connected to the endoscope, into an image reproduction unit and there to display them.

A specific application for an endoscope of this kind is combustion research on piston engines on engine test stands. The endoscope can be used to visualize fuel injection, mixture distribution, and the process by which the combustion gases are combusted, while the engine is running.

Further applications for an endoscope of this kind are combustion research in gas turbines and jet engines, and on flames in oil burners, charge monitoring in furnaces, routine monitoring in incineration plants and blast furnaces, or the visualization of chemical reactions in chemical reactors.

A feature common to the aforesaid applications is the fact that a hot medium and/or infrared radiation, to which the endoscope is exposed during operation, can be present in the observation cavity being inspected.

In order to inspect an observation cavity with the endoscope, an orifice is made in a wall of the observation cavity, into which the distal end of the endoscope is introduced with the aid of a tubular insert that is open at both ends. To additionally allow the observation of non-self-illuminating processes, an illumination system is also used, introduced through a second orifice in the wall of the observation cavity.

During inspection of the observation cavity, the distal end of the endoscope introduced into the opening in the wall of the observation cavity, for example an engine, is exposed to the combustion chamber environment. In diesel engines, for example, average combustion cycle temperatures of up to approx. 1800° C. are present during operation. The system arranged in the shaft of the endoscope is designed, however, only for operating temperatures in the range between max. 100° C. to 200° C. The optical components themselves and also a mechanism present at the distal end of the endoscope would withstand even higher temperatures, but the optical cement and the adhesive joints that are used for assembly and installation of the optical system in the shaft would not.

The endoscope known from the aforesaid DE 44 38 229 C2 for observation of cavities that are under pressure and/or at high temperature has a pressure-tight encapsulation of the endoscope comprising a protective tube that surrounds the endoscope and that has, at the level of the endoscope objective, a pressure-resistant window made of quartz glass. The protective tube thus forms an external shaft, while the endoscope tube receives the optical system.

To prevent the distal end of the endoscope in the region of the objective from coming into direct contact with the hot medium, such endoscopes are generally used together with a test-tube-shaped glass shield that is inserted into the orifice in the wall of the observation cavity, and into which the distal end of the endoscope is introduced. While the glass shield does effect separation and isolation of the optical system of the endoscope from the hot medium present in the combustion chamber, it does not offer any protection against infrared radiation. It has been found that when a glass shield is used in a combustion chamber environment with combustion cycle temperatures of approximately 1800° C., temperatures in the range of 700° C. are still present behind the glass shield. Temperatures of that magnitude can result, however, in damage to the optical system of the endoscope.

The endoscope known from DE 44 38 229 C2 has a protective tube configured as a flow tube, although it is open at its distal end, such that it can be acted upon by a cooling and flushing medium, the cooling and flushing medium emerging into the observation cavity at the distal end of the flow tube, at the level of the distal end of the endoscope shaft.

Also known are endoscopes which have a cooling system that has a delivery and return for a cooling medium, for example a gas or a liquid, both a delivery line and a return line for the cooling line being integrated into the shaft of the endoscope. A cooling system of this kind, however, demands considerable space in the shaft of the endoscope, the result being that known endoscopes of this kind have a correspondingly large shaft cross section which makes the known endoscopes difficult to use for many applications, for example in modern multi-valve engines in which a small shaft diameter is necessary for structural reasons.

DE 33 16 167 C2 has furthermore disclosed a periscope for observation of a reaction chamber of a high-temperature reactor, having a periscope optical system that has a front lens, turned toward the reaction chamber, adjoining which is a conical hollow body whose smaller end surface is turned toward the reaction chamber and forms an aperture opening for the periscope optical system. The periscope optical system is surrounded coaxially by a tubular water-cooled jacket, thus forming an interstice that is open toward the reaction chamber and communicates with a source of a flushing gas whose supply pressure is greater than the operating pressure in the reaction chamber. A gap in the form of a conical envelope is present between the jacket and the conical hollow body. The interstice between the periscope optical system and the tubular jacket serves as a delivery cross section for the purging gas. The interstice is open at the distal end so that the purging gas emerges into the reaction space. The open distal end of this purging space is configured as an annular nozzle, by the fact that the conical hollow body, which together with the tubular jacket forms the annular nozzle at the distal end, is placed onto the front lens of the periscope optical system.

Also known, from DD 276 540 A1, is a heat shield for an endoscope for examining components in hot enclosed cavities, a decrease in the heat load in the region of the sensitive optical system being achieved by the fact that a replaceable casing equipped with a sight window, intended for the reception of a gaseous cooling medium, and adapted to the diameter of the endoscope—is arranged around the endoscope, further that adjoining the upper boundary of the casing is a receiving and distributing device for the cooling medium, and that the lower end of the casing is closed off by a plug.

Additionally known, from DE Published Application 26 41 594, is an endoscope for the observation of hot spaces that has inner and outer tubes which are arranged concentrically at a distance from one another and both extend into the observation cavity, as well as an annular cover plate that is mounted on the end of the outer tube inside the observation cavity and forms a viewing opening. The latter is equipped with a glass window, in front of which is arranged a transparent protective mica shield. A water cooling jacket is arranged around the inner tube, means being provided for circulating a coolant: through the jacket.

Lastly, DE Published Application 1 031 992 has disclosed an endoscope for observation of the combustion chambers and flue gas ducts of steam generators during operation, the endoscope being enclosed by a jacket for heat protection, and a coolant being directed through the interstice between the jacket and the endoscope and emerging at the eyepiece through a series of openings, arranged concentrically around it, in the form of a protective curtain.

In all of the known endoscopes cited above, the heat protection features are limited to cooling of the shaft by way of a gaseous or liquid cooling medium that is directed along the inner shaft which receives the optical system. If the heat protection features are limited merely to cooling, however, this requires a corresponding flow cross section for the cooling medium or even the use of an additional glass shield as a conduit for the cooling medium. The overall cross section of the known endoscopes is therefore large, so that they can be used only to a restricted extent, or not at all, in situations in which a smaller shaft diameter is necessary for structural reasons.

It is therefore the object of the invention to develop an endoscope of the kind cited initially in such a way that improved heat protection for the optical system arranged in the shaft is achieved independently of any cooling.

SUMMARY OF THE INVENTION

According to the present invention this object is achieved, in terms of the endoscope cited initially, in that the outer shaft at least partially has, in the region of its distal end, a coating that reflects infrared radiation.

The heat protection feature that is provided in the case of the endoscope according to the present invention, in the form of the reflective coating that can be configured as a thin film, has the particular advantage that because it is reflected from the coating provided on the outer shaft, the infrared radiation cannot result in absorptive heating of the outer shaft. In other words, this heat protection begins, without the absolute need to use a glass shield and an external cooling system, directly at the outer shaft, rather than only in the region between the inner shaft and outer shaft as is the case with the heat protection features known from the existing art, in the form of a cooling system by way of a purging medium between the inner and outer shaft. The configuration of the endoscope according to the present invention, on the other hand, has the advantage that the interstice between the inner shaft and outer shaft can be reduced in cross section, and even without being acted upon by a cooling medium can be simply configured as an air space. Of course the interstice between the inner shaft and outer shaft can additionally be acted upon by a cooling medium. This is then possible as a flanking heat protection feature with a smaller purging cross section. A glass shield can also be used as an additional flanking feature, although this is not absolutely necessary. A further advantage of the heat protection feature that is provided is the fact that a coating of this kind can be vacuum-deposited in the form of a metallic covering as a very thin film, so that the outside diameter of the shaft is not perceptibly increased by the reflective coating.

The underlying object of the invention is completely achieved in this fashion.

It is preferred in this context if the reflective coating is constituted such that its reflective capability is optimized for the radiation of a black body at a temperature of 2200° C.

The emission spectrum of a soot flame corresponds approximately to the radiation of a 2200° C. black body with an emission maximum at a wavelength $\lambda=1100$ nm. With a reflective capability of this kind for the reflective coating, the endoscope according to the present invention is therefore particularly advantageous for use in the investigation of combustion processes in internal combustion engines or furnaces.

In a further preferred embodiment, the reflective coating is a gold film.

The advantage of this feature is that gold has an absorption coefficient of approx. 0.01 at the aforesaid emission wavelength $\lambda=1100$ nm. Other metals, on the other hand, have absorption coefficients more than an order of magnitude greater. When an outer shaft coated with a gold film is irradiated, the advantageous result is therefore that only a very slight heating of the outer shaft occurs, preventing the outer shaft from acting as a heat source and radiating heat onto the inner shaft.

In a further preferred embodiment, there is arranged at the distal end of the shaft, on the light-entry side, an optical bandpass filter that is transparent in the visible spectral range and that at least partially absorbs and/or reflects radiation in the infrared spectral range.

The advantage of this feature is that light in the visible frequency spectrum, which is necessary for visualization of the process occurring in the observation cavity, can be coupled in unimpeded fashion into the optical system of the endoscope, whereas radiation in the infrared spectral range cannot enter the optical system. The result is to prevent the black, infrared-absorbing aperture stop of the optical system from becoming excessively heated. This is because absorbed heat can only be very poorly dissipated, since a large heat transfer resistance exists between the aperture stop and the outer sheath of the objective. The optical bandpass filter used can be a commercially available heat protection filter that can be adhesively bonded in front of the front lens of the endoscope.

In a preferred embodiment, the optical bandpass filter is a thin-film bandpass filter.

The optical bandpass filter can also be applied as a thin film onto the front lens, which then constitutes the substrate for the filter.

It is further preferred in this context if the optical bandpass filter additionally has a substrate that absorbs infrared radiation.

This feature further improves the effectiveness of the optical bandpass filter, especially if the infrared radiation-reflecting coating of the bandpass filter is designed so that it reflects the short-wave component in the near infrared spectrum, and the long-wave portion is then absorbed by the filter substrate of the optical bandpass filter. Damaging infrared radiation can thus be effectively filtered out over a considerably wider spectral range. The filter substrate can also be constituted by the front lens of the optical system itself if a suitable material is selected for the front lens.

In a further preferred embodiment, a lumen is constituted between the inner shaft and outer shaft as a delivery conduit for a cooling medium from the proximal end to the distal end of the shaft.

This feature allows a further improvement in the protection of the optical system from extremely high temperatures. The lumen present between the inner shaft and the outer shaft spaced away from it offers the possibility of configuring a delivery conduit with a large flow cross section and thus with a lower flow resistance, resulting in greater cooling performance due to improved convection at the distal end. The cooling medium can also advantageously flush the back of the front lens and the optical bandpass filter, thereby additionally cooling the optical system at the distal end of the inner shaft.

It is preferred in this context if at least one outlet opening for the cooling medium is arranged in the outer shaft in the region of the distal end.

The considerable advantage of this feature is that in contrast to the cooled endoscopes known from the existing art, a return conduit integrated into the shaft can be dispensed with, so that the entire lumen between the inner shaft and outer shaft can be used as a delivery conduit, so that, as mentioned earlier, cooling performance can be increased. While the cooling performance is at the same time higher because of the configuration of the cooling system according to the present invention, the cross section of the endoscope shaft can in fact be reduced, so that the endoscope according to the present invention can also be used, in particular, for combustion chamber research on modern multi-valve engines in which, because of structural circumstances and for space reasons, only a smaller-diameter orifice can be made in the cylinder head for introduction of the endoscope.

In a further preferred embodiment, the cooling medium is a gas, in particular compressed air.

A gas as cooling medium has the advantage, as compared to a liquid, that it has little or no disruptive influence on the process being observed if it comes into contact with the atmosphere of the observation cavity upon emergence from the outer shaft. Compressed air, in particular, has the advantage that it can be forced in compressed fashion through the delivery conduit. Because of the greater density of compressed air, the heat capacity of the air is increased and a greater cooling performance can therefore be achieved.

In a further preferred embodiment, a distally closed glass shield is arranged around the distal end of the shaft, the cooling medium being discharged in the proximal direction between the outer shaft and the glass shield.

The advantage of this feature is that cooling medium emerging from the outer shaft cannot get into the observation cavity, where it might disrupt the combustion process or the like that is being observed. Whereas the glass shields used in the existing art were provided only for insulation or separation of the distal end from the medium in the observation cavity, provision is now made, in the embodiment of the endoscope according to the present invention, for using the space between the glass shield and the outer shaft of the endoscope as a return conduit for the cooling medium. The advantageous result is that the delivery conduit can be configured in the endoscope shaft with a greater flow cross section while the overall cross section of the endoscope shaft is in fact reduced.

In a further preferred embodiment, the at least one outlet opening is configured such that the cooling medium emerges in a manner directed substantially away from the observation cavity.

The advantage of this feature is that immediately upon its emergence from the outer shaft, there is defined for the cooling medium a flow direction that is directed away from the observation cavity. As a result, for example if no glass shield is present, the cooling medium is prevented from mixing with the medium in the observation cavity and causing any cooling or other disruption that might adversely affect the process being observed.

In a further preferred embodiment, flow obstacles, which prevent the cooling medium emerging from the at least one outlet opening from flowing into a region of the glass shield located in the visual field region of the endoscope, are arranged between the glass shield and the outer shaft.

The advantage of this feature is that the cooling medium emerging from the outer shaft does not cause cooling in the distal region of the glass shield located in the visual field region of the endoscope. This is because cooling of the region of the glass shield located in the visual field region of the endoscope might cause combustion vapors to condense on the outer side of the glass shield facing toward the observation cavity in the form of soot, which adversely affects the passage of light in the visible spectrum. This is prevented by the flow obstacles provided according to the present invention.

In a further preferred embodiment, the at least one outlet opening is arranged laterally in the outer shaft.

The advantage of this feature is that as the cooling medium emerges, it possesses little or no flow component toward the observation cavity or, if a glass shield is arranged around the shaft, toward the distal region of the glass shield. If a glass shield is used, this feature therefore contributes to a reduction in soot accumulation on the glass shield in the visual field region.

In a further preferred embodiment, several outlet openings are arranged in circumferentially distributed fashion in the outer shaft.

The advantage of this feature is that the flow of cooling medium between the inner shaft and outer shaft is distributed in radially symmetrical fashion around the inner shaft, and brings about homogeneous, effective cooling around the inner shaft and therefore around the optical system. This again counteracts any soot accumulation on the glass shield that may be present.

In a further preferred embodiment, the at least one outlet opening is configured so that the cooling medium is depressurized upon emergence.

The advantage of this feature is that depressurization of the cooling medium as it emerges causes it to absorb heat from its surroundings by expanding, thus resulting in a further improvement in cooling of the distal end of the shaft. Depressurization of the cooling medium upon emergence through the at least one outlet opening can be brought about by corresponding dimensioning of the opening cross section.

In a further preferred embodiment, a shutoff apparatus for throttling the delivery of cooling medium is provided at the proximal end.

The advantage of this feature is that by way of the shutoff apparatus, the flow of cooling medium and thus the cooling performance can be adjusted in accordance with requirements.

It is further preferred in this context if temperature-deformable elements, in particular bimetallic elements, which effect throttling of the delivery of cooling medium are arranged in the distal region of the shaft.

The advantage of this feature is that the cooling performance can be regulated automatically as a function of temperature by deformation of the temperature-deformable elements.

In a further preferred embodiment, the delivery conduit is additionally designed for taking samples.

The advantage of this feature is that the endoscope is also suitable, without major design outlay, for the taking of samples such as combustion vapors or fuel mixtures.

In a further preferred embodiment, the delivery conduit is additionally designed for the delivery of reagents.

The advantage of this feature is that the endoscope can also be used, without major technical outlay, to introduce reagents into the observation cavity in order to deliberately influence the process being observed.

In preferred applications, the endoscope according to the present invention is used to investigate combustion processes in piston engines, in oil-fired furnaces, jet engines, and gas turbines, or to investigate chemical reactions in a reaction chamber.

Further advantages are evident from the description below of the appended drawings.

It is understood that the features mentioned above and those yet to be explained below can be used not only in the respective combinations indicated, but also in other combinations or in isolation, without leaving the context of the present invention.

BRIEF DESCRIPTION OF THE DRAWINGS

Exemplary embodiments of the invention are shown in the drawings and will be described in more detail hereinafter with reference to the drawings, in which.

DETAILED DESCRIPTION OF PREFERRED EMBODIMENTS

Figure 1:
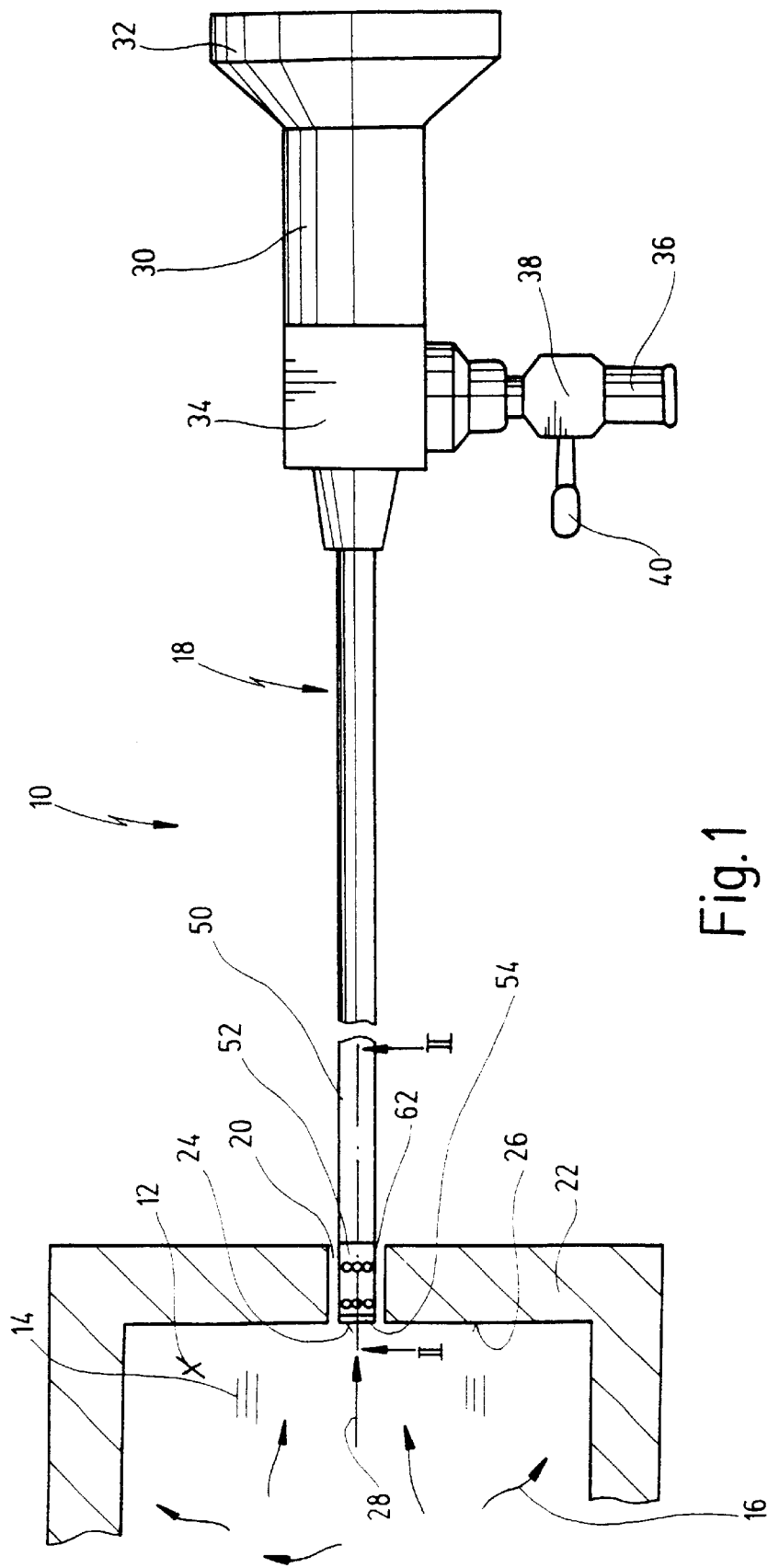
FIG. 1 shows a side view of an endoscope for inspection of an observation cavity, in a general representation.

FIG. 1 shows an endoscope, labeled in its entirety with the general reference character 10, for inspection of an observation cavity 12. Observation cavity 12 is, for example, the combustion chamber of a piston engine.

A hot medium 14 is present in observation cavity 12, in the case of a combustion engine in the form of combustion gases which moreover contain extremely fine soot particles.

Also present in observation cavity 12 is an infrared radiation 16 that is emitted, for example, from soot particles acting as black bodies.

For the case in which observation cavity 12 is the combustion chamber of a piston engine, temperatures of approximately 2000° C. are present in observation cavity 12 during a combustion cycle.

Endoscope 10 has an endoscope shaft 18 whose distal end is inserted into an orifice 20 in a wall 22 surrounding observation cavity 12. For the case in which observation cavity 12 is the combustion chamber of a piston engine, wall 22 represents the cylinder head housing.

Figure 2:
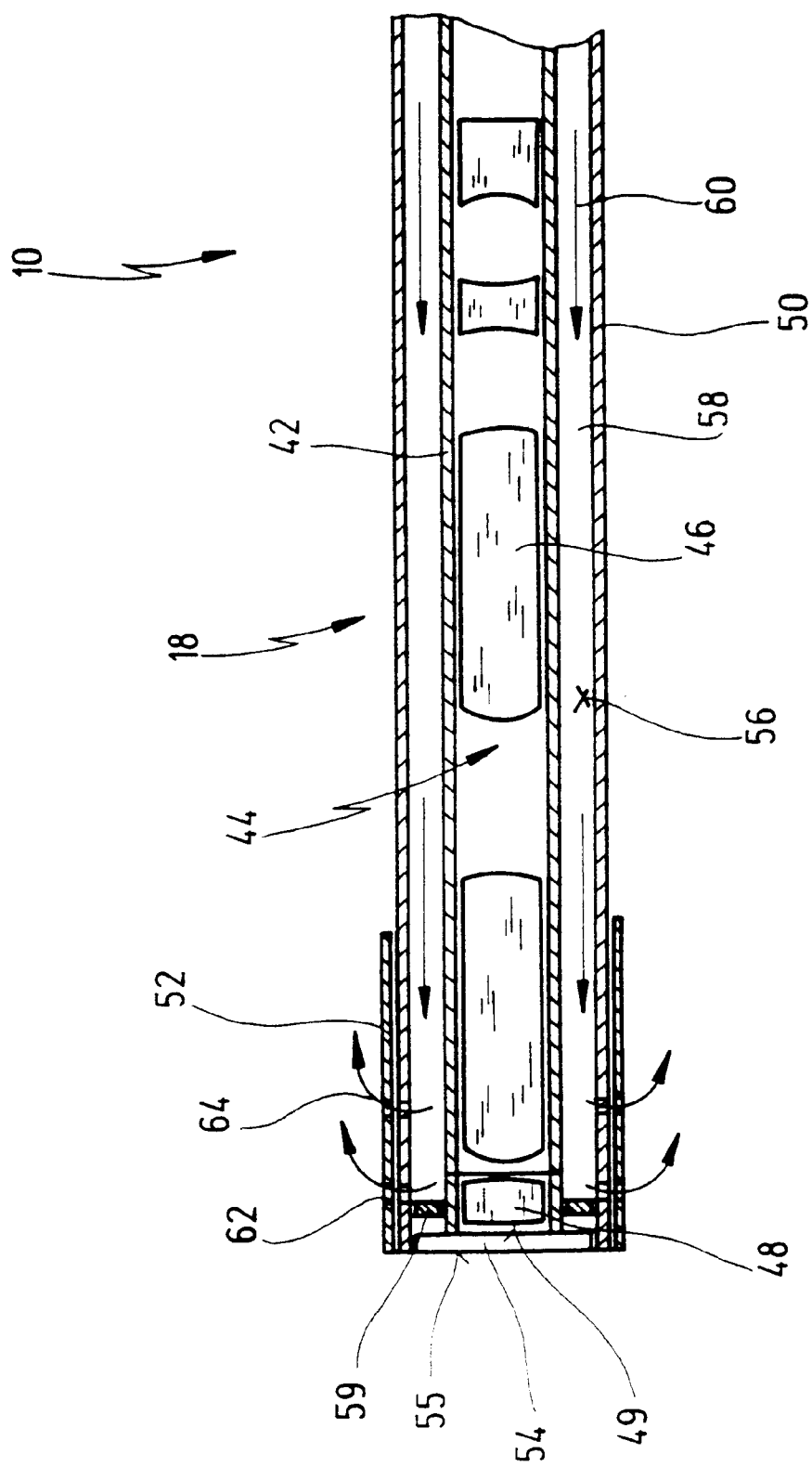
FIG. 2 shows a distal region of the endoscope in longitudinal section along line II—II in FIG. 1, at an enlarged scale.
Figure 3:
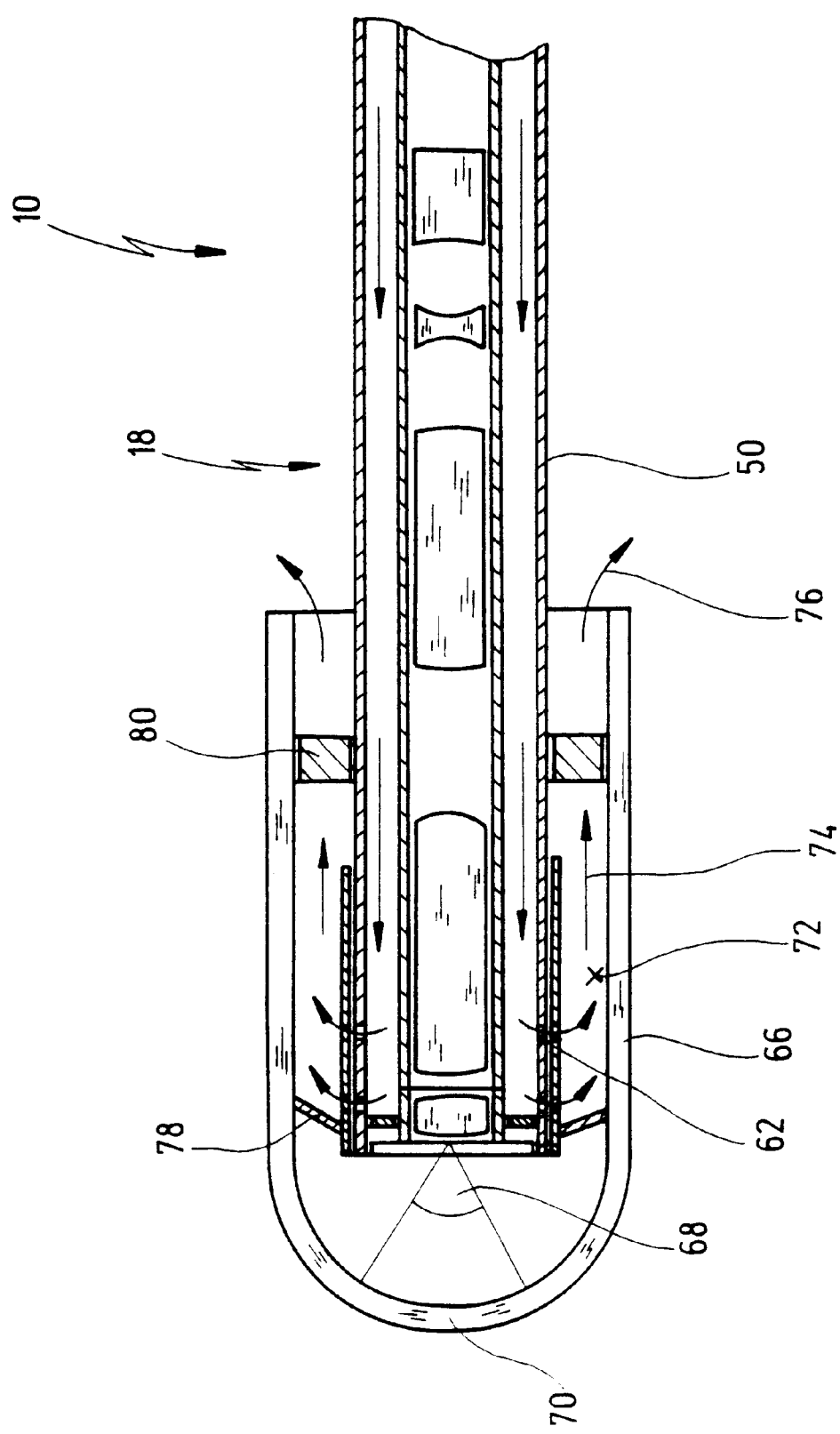
FIG. 3 also shows the distal region of the endoscope in a representation corresponding to FIG. 2, a glass shield additionally being arranged around the distal end of the shaft.

Wall 22 is not shown in FIGS. 2 and 3.

The distal end of shaft 18 is inserted into orifice 20 using an insert (not shown) that is configured in the form of a cylindrical metal tube, open at both ends, which has external threads that are thread-joined to corresponding internal threads in orifice 20, whereas shaft 18 for its part is immobilized on the insert.

When shaft 18 is in the inserted state, a light entry surface 24 of endoscope 10 is located approximately at the level of an inner surface 26 of wall 22. Light from observation cavity 12 enters endoscope 10 through light entry surface 24, as indicated by an arrow 28.

At the proximal end of shaft 18, endoscope 10 has an eyepiece 30 with an eyepiece cup 32. Observation cavity 12 can be observed directly with the eye using eyepiece cup 32, or a camera, for example a CCD camera, can be attached to eyepiece 30 and then transfers the image received from observation cavity 12 to an image reproduction unit where it is made visible.

In addition, a connecting piece 36 is arranged on a housing part 34 of endoscope 10 for connection of a cooling line (not shown). Through connecting piece 36, a cooling medium is delivered into shaft 18 of endoscope 10 in a manner to be described below in more detail.

Connecting piece 36 is equipped with a shutoff apparatus 38 that has a manually actuable stopcock 40. The delivery of cooling medium can be regulating by actuating stopcock 40 between a maximally open position and a maximally closed position of shutoff apparatus 38.

The configuration of shaft 18 in the region of its distal end will now be described in more detail with reference to FIG. 2.

Shaft 18 has an inner shaft 42 in which an optical system 44, comprising multiple lenses 46 arranged in a relay arrangement, is received. Optical system 44 further comprises at the distal end an objective 48 whose distal front surface forms a light entry surface 49 of optical system 44. Instead of an optical system 44 constituted in relay fashion from multiple rod lenses 46, said system can also comprise a coherent optical fiber bundle that is suitable for imaging the light entering through light entry surface 24 in the proximal direction into eyepiece 30.

Shaft 18 furthermore has an outer shaft 50 that surrounds inner shaft 42 at a distance. Outer shaft 50 is configured in the form of a cylindrical tube arranged concentrically with inner shaft 42. Outer shaft 50 is immovably joined to inner shaft 42 at the proximal end of shaft 18, for example configured integrally, but can also be configured so it can be removed, for example pulled out, from inner shaft 42.

In the region of its distal end, shaft 18 is configured so that it is substantially impermeable to infrared radiation 16 (cf. FIG. 1).

For that purpose, outer shaft 50 has in the region of its distal end, at least partially, a coating 52 that reflects infrared radiation 16. Coating 52 is provided on the outer side of outer shaft 50. Reflective coating 52 is constituted such that its reflective capability is optimized for the radiation of a black body at 2200° C. In the present example, reflective coating 52 is a gold film.

Additionally arranged at the distal end of shaft 18 on the light-entry side, i.e. in front of light entry surface 49 of optical system 44, is an optical bandpass filter 54 that is transparent to the light in the visible spectral range entering in accordance with arrow 28 in FIG. 1, and that at least partially absorbs and/or reflects radiation in the infrared spectral range, i.e. infrared radiation 16.

A commercially available heat protection filter that is adhesively bonded onto the front lens of objective 48 can be used as optical bandpass filter 54. The filtering film can also be applied directly onto the front lens.

A coating that reflects infrared radiation 16 is provided on a front surface 55 of optical bandpass filter 54 that constitutes light entry surface 24 of endoscope 10. The substrate of bandpass filter 54 can be such that it additionally absorbs the short-wave portion of infrared radiation 16, while the principal portion of long-wave infrared radiation 16 is reflected and absorbed by the filter coating of optical bandpass filter 54, so that over the entire infrared spectral range, infrared radiation 16 is not coupled into objective 48.

A lumen 56 between inner shaft 42 and outer shaft 50, which is configured as a cylindrical annular space, is configured as delivery conduit 58 for the aforesaid cooling medium from the proximal end to the distal end of shaft 18. A sealing ring 59 at the distal end of shaft 18 closes off lumen 56.

The cooling medium used is compressed air, which arrives from an external compressed-air source (not shown), is delivered through connecting piece 36 into shaft 18, and flow through the entire cylindrical annular lumen 56 between inner shaft 42 and outer shaft 50 in radially symmetrical fashion and at excess pressure, i.e. in compressed fashion. The flow of cooling medium, i.e. of compressed air, is illustrated in FIG. 2 by arrows 60.

Several outlet openings 62 are arranged in outer shaft 50 in the region of the distal end. Outlet openings 62 are located approximately at the level of objective 48, and are configured laterally in outer shaft 50 in the form of small orifices in outer shaft 50 (cf. also FIG. 1). Corresponding openings through which the cooling medium escapes are provided in reflective coating 52 on outer shaft 50.

Outlet openings 62, which are provided in outer shaft 50 in circumferentially distributed fashion, are configured such that the cooling medium emerging from said outlet openings 62 emerges away (in FIG. 1) from observation cavity 12, i.e. toward the proximal end of shaft 18. This is brought about by corresponding shaping of outlet openings 62, which causes a change in the direction of flow of the cooling medium as it emerges. The flow of the cooling medium emerging from outlet openings 62 is indicated by arrows 64.

Outlet openings 62 are furthermore configured in such a way that the pressurized cooling medium, i.e. the compressed air, is depressurized upon emergence from outlet openings 62. Upon expansion of the cooling medium emerging from outlet openings 62, the cooling medium absorbs heat of expansion from its surroundings, thus bringing about additional cooling. The heat that is taken up is then discharged in the proximal direction by the cooling medium. In order to bring about the aforementioned depressurization effect of the cooling medium, outlet openings 62 are configured with an opening cross section of correspondingly small dimensions, so that the pressure present in delivery conduit 58 is higher than in the external region of outer shaft 50.

The cooling medium flows in homogeneous and radially symmetrical fashion around inner shaft 42, and is therefore capable of carrying off heat over the entire periphery of inner shaft 42.

In FIG. 3, a glass shield 66 is additionally arranged around the distal end of shaft 18 of endoscope 10. Glass shield 66 is closed distally and has approximately the shape of a test tube. Glass shield 66 provides complete separation of the distal end of shaft 18 from hot medium 14 in observation cavity 12 in FIG. 1.

Glass shield 66 is transparent at least in a region 70 located in visual field region 68 of endoscope 10. Glass shield 66 can be made, for example, of a heat-resistant glass, for example quartz glass.

The cooling medium emerging out of outlet openings 62 from outer shaft 50 is discharged in the proximal direction (as shown by arrows 74) in an interstice 72 present between outer shaft 50 and glass shield 66, and emerges from glass shield 66 (as shown by arrows 76) at the proximal end of glass shield 66, which in the operating state is located outside observation cavity 12.

Also arranged between glass shield 66 and outer shaft 50 are flow obstacles 78 which prevent the cooling medium flowing out of outlet openings 62 from getting into region 70 of glass shield 66 located in visual field region 68. This prevents any cooling of region 70, and thus any condensation of combustion vapors or soot in this region, which might adversely affect visibility through region 70.

Flow obstacles 78 are configured in such a way that they deflect the flow of cooling medium toward the proximal end of glass shield 66, to the extent this not already been at least partially effected by the shaping of outlet openings 62.

Also provided, between glass shield 66 and outer shaft 50, are centering elements 80 which make possible centered positioning of the distal end of shaft 18 in glass shield 66.

While endoscope 10 is in operation, the delivery of cooling medium can be regulated by way of shutoff apparatus 38 or stopcock 40 in order to establish a cooling performance suitable for requirements.

In addition, while the endoscope is in operation, delivery conduit 58 can also be used to deliver reagents into observation cavity 12 or to take samples from observation cavity 12. Further connectors for corresponding delivery and discharge lines can then be provided at the proximal end of endoscope 10.

It is also possible for temperature-deformable elements (not shown), for example bimetallic elements, which also regulate the flow through delivery conduit 58 during operation automatically as a function of temperature, to be arranged in the distal region of the shaft.

What is claimed is:

1. An endoscope for inspection of an observation cavity, comprising:
   a shaft, said shaft having an inner shaft and an outer shaft, said outer shaft surrounding said inner shaft at a distance;
   an optical system arranged in said inner shaft;
   said shaft being configured in the region of its distal end in such a way that it is substantially impermeable to electromagnetic radiation in the infrared spectral range, wherein said outer shaft at least partially has, in the region of its distal end, a coating that reflects infrared radiation; and
   wherein a lumen is constituted between said inner shaft and said outer shaft as a delivery conduit for a cooling medium from the proximal end to the distal end of said shaft.

2. The endoscope of claim 1, wherein said reflective coating is constituted such that its reflective capability is optimized for the radiation of a black body at a temperature of 2200° C.

3. The endoscope of claim 1, wherein said reflective coating is a gold film.

4. The endoscope of claim 1, wherein there is arranged at the distal end of said shaft, on the light-entry side, an optical bandpass filter, that is transparent in the visible spectral range and that at least partially absorbs and/or reflects radiation in the infrared spectral range.

5. The endoscope of claim 4 wherein said optical bandpass filter additionally has a substrate that absorbs infrared radiation.

6. The endoscope of claim 1, wherein at least one outlet opening for said cooling medium is arranged in said outer shaft in the region of its distal end.

7. The endoscope of claim 6, wherein said cooling medium is a gas, in particular compressed air.

8. The endoscope of claim 1, wherein a lumen is constituted between said inner shaft and said outer shaft as a delivery conduit for a cooling medium from the proximal ends to the distal end of said shaft, wherein said cooling medium is a gas, in particular compressed air.

9. The endoscope of claim 1, wherein a lumen is constituted between said inner shaft and said outer shaft as a delivery conduit for a cooling medium from the proximal end to the distal end of said shaft, and wherein a distally closed glass shield is arranged around the distal end of said shaft, the cooling medium being discharged in the proximal direction between said outer shaft and said glass shield.

10. The endoscope of claim 1, wherein a lumen is constituted between said inner shaft and said outer shaft as a delivery conduit for a cooling medium from the proximal ends to the distal end of said shaft, and wherein said at least one outlet opening is configured such that said cooling medium emerges in a manner directed substantially away from said observation cavity.

11. The endoscope of claim 1, wherein a lumen is constituted between said inner shaft and said outer shaft as a delivery conduit for a cooling medium from the proximal end to the distal end of said shaft, wherein at least one outlet opening for said cooling medium is arranged in said outer shaft in the region of its distal end, wherein a distally closed glass shield is arranged around the distal end of said shaft, and wherein flow obstacles, which prevent said cooling medium emerging from said at least one outlet opening from flowing into a region of said glass shield located in the visual field region of said endoscope, are arranged between said glass shield and said outer shaft.

12. The endoscope of claim 1, wherein a lumen is constituted between said inner shaft and said outer shaft as a delivery conduit for a cooling medium from the proximal end to the distal end of said shaft, wherein at least one outlet opening for said cooling medium is arranged in said outer shaft in the region of its distal end, and wherein said at least one outlet opening is arranged laterally in said outer shaft.

13. The endoscope of claim 1, wherein a lumen is constituted between said inner shaft and said outer shaft as a delivery conduit for a cooling medium from the proximal end to the distal end of said shaft, wherein several outlet openings are arranged in circumferentially distributed fashion in said outer shaft.

14. The endoscope of claim 1, wherein a lumen is constituted between said inner shaft and said outer shaft as a delivery conduit for a cooling medium from the proximal end to the distal end of said shaft, wherein at least one outlet opening for said cooling medium is arranged in said outer shaft in the region of its distal end, and wherein said at least one outlet opening is configured so that said cooling medium is depressurized upon emergence.

15. The endoscope of claim 1, wherein a lumen is constituted between said inner shaft and said outer shaft as a delivery conduit for a cooling medium from the proximal end to the distal end of said shaft, and wherein a shutoff apparatus for throttling the delivery of said cooling medium is provided.

16. The endoscope of claim 15, wherein temperature-deformable elements, in particular bimetallic elements, which effect said throttling of the delivery of said cooling medium are arranged in the distal region of said shaft.

17. The endoscope of claim 1, wherein a lumen is constituted between said inner shaft and said outer shaft as a delivery conduit for a cooling medium from the proximal end to the distal end of said shaft, wherein said delivery conduit is additionally designed for taking samples.

18. The endoscope of claim 1, wherein a lumen is constituted between said inner shaft and said outer shaft as a delivery conduit for a cooling medium from the proximal end t the distal of said shaft, wherein said delivery conduit is additionally designed for the delivery of reagents.

19. An endoscope for inspection of an observation cavity, comprising:

a shaft, said shaft having an inner shaft and an outer shaft, said outer shaft surrounding said inner shaft at a distance;

an optical system arranged in said inner shaft;

said shaft being configured in the region of its distal end in such a way that it is substantially impermeable to electromagnetic radiation in the infrared spectral range, wherein said outer shaft at least partially has, in the region of its distal end, a coating that reflects infrared radiation;

wherein a lumen is constituted between said inner shaft and said outer shaft as a delivery conduit for a cooling medium from the proximal end to the distal end of said shaft; and wherein there is arranged at the distal end of said shaft, on the light-entry side, an optical bandpass filter, preferably a thin-film bandpass filter, that is transparent in the visible spectral range and that at least partially absorbs and/or reflects radiation in the infrared spectral range.

* * * * *